(12) United States Patent
Kamitani

(10) Patent No.: US 6,346,334 B1
(45) Date of Patent: Feb. 12, 2002

(54) PLASMA DISPLAY PANEL ASSEMBLY

(75) Inventor: Kiyoaki Kamitani, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/494,355

(22) Filed: Jan. 31, 2000

(30) Foreign Application Priority Data

Feb. 2, 1999 (JP) .............................................. 11-025489

(51) Int. Cl.$^7$ .......................... B32B 25/14; B29C 41/28
(52) U.S. Cl. ................ 428/521; 313/493; 428/355 BL; 428/356; 428/440; 428/441; 428/461; 428/465
(58) Field of Search .......................... 313/493; 428/356, 428/355 BL, 440, 441, 461, 465, 521

(56) References Cited

U.S. PATENT DOCUMENTS 5,831,374 A * 11/1998 Morita et al. .................. 313/46

* cited by examiner

Primary Examiner—D. S. Nakarani
(74) Attorney, Agent, or Firm—Armstrong, Westerman, Hattori, McLeland & Naughton, LLP

(57) ABSTRACT

A plasma display panel assembly comprising a panel, a heat radiation plate and a heat radiation adhesive sheet layer interposed therebetween. A heat radiation adhesive sheet for use in the heat radiation adhesive sheet layer is formed of a heat radiation adhesive composition containing an elastic styrene polymer, an adhesive imparting agent, an oil and a thermal conductivity imparting agent.

8 Claims, 3 Drawing Sheets

PLASMA DISPLAY PANEL ASSEMBLY

FIELD OF INVENTION

This invention relates to a plasma display panel (PDP) assembly used for a flat panel image display (wall-suspended TV) and the like.

BACKGROUND OF INVENTION

A plasma display panel assembly generates ultraviolet rays by electrical discharge and irradiates the ultraviolet rays to phosphors for light emission. Therefore, it requires a system to release heat generated by the electric discharge. Particularly, as keeping high luminance for high definition necessitates more heat generation, it is conventional that a heat radiation plate is provided on a rear face of the panel assembly which, through a thermally conductive sheet, dissipates heat from the whole panel assembly and keeps the temperature even on the whole face.

FIG. 4 shows one example of a plasma display panel assembly mentioned above. The plasma display panel assembly 1 comprises a glass panel 2, an aluminum chassis 3 and a thermally conductive sheet layer 4 provided therebetween. The thermally conductive sheet layer 4, as shown in FIG. 5, comprises an adhesive double coated tape 5 and a thermally conductive sheet 6 provided therein, and the sheet layer is firmly attached to the glass panel 2 and the aluminum chassis 3 mainly by means of the adhesiveness of the adhesive double coated tape 5. The plasma display panel assembly 1 can dissipate the heat generated on the glass panel 2 through the thermally conductive sheet 6.

The plasma display panel assembly 1, however, has the glass panel 2 firmly attached to the aluminum chassis 3 so as to be integral with each other by the adhesive double coated tape 5 of the thermally conductive layer 4. Thus, it is difficult to separately collect the glass panel 2 and the aluminum chassis 3 at the end of their service life and the like, of the plasma display panel assembly 1, and further to dispose of the panel and chassis as separated garbage. Conventionally, the thermally conductive sheet 6 is formed mainly of a thermosetting silicone material, and the adhesive double coated tape 5 is formed mainly of a thermosetting acrylic or synthetic rubber material. Thus, for separate collection, the panel is heated to a temperature of not less than 300° C. thereby to decompose or carbonize the thermally conductive sheet layer 4, or the panel is impregnated for a long time with a solvent or the like to swell the sheet. Therefore, it is desired to provide a panel assembly which maintains a good attachment and smoothly releases heat during operation, and which can be simply separated for collection when a disposal treatment and the like is necessary.

In view of the forgoing, it is an object of the present invention to provide a plasma display panel assembly which smoothly releases heat during operation and which is simply separated into a panel and a heat radiation plate.

SUMMARY OF THE INVENTION

In order to accomplish the above object, the plasma display panel assembly of the present invention comprises a panel, a heat radiation plate and a heat radiation adhesive sheet layer provided therebetween, wherein a heat radiation adhesive sheet for use in the heat radiation adhesive sheet layer is formed of a heat radiation adhesive composition containing the following components A to D.

(A) elastic styrene polymer
(B) adhesive-imparting agent
(C) oil
(D) thermal conductivity-imparting agent The inventor of the present invention has made an intensive study to obtain the plasma display panel assembly which smoothly releases heat during operation and which is easily separated into a panel and a heat radiation plate. In the course of the study, it has been found that a heat radiation adhesive sheet is usable, which exhibits both a good adhesion and heat radiation and makes an easy separation possible, instead of an adhesive double coated tape which causes a problem in separating the panel and the heat radiation plate. As a result of reviewing various materials, when a heat radiation adhesive composition which comprises an elastic styrene polymer (component A), an adhesive-imparting agent (component B), an oil (component C) and a thermal conductivity-imparting agent (component D), is used as a material for formation of the heat radiation adhesive sheet, the sheet exhibits both a good adhesion and heat radiation at a temperature of −20 to 100° C. during operation. Further, at a temperature of 101 to 120° C., a little greater than 100° C., the sheet is softened and fused for an easy separation. Thus, the inventor has attained the invention. Moreover, the heat radiation adhesive sheet formed of the heat radiation adhesive composition is solvent-soluble, which enables the display panel assembly to be separated into the panel and heat radiation plate by use of a solvent.

Particularly, when the content of each component in the heat radiation adhesive composition is in a specific range, a more preferable result can be obtained. When the elastic styrene polymer has a glass transition temperature within a specific range, a more preferable result can be obtained. Further, the use of a specific adhesive-imparting agent, oil, thermal conductivity-imparting agent leads to a more preferable result.

DETAILED DESCRIPTION OF THE PREFERRED EMBODIMENTS

Figure 1A:
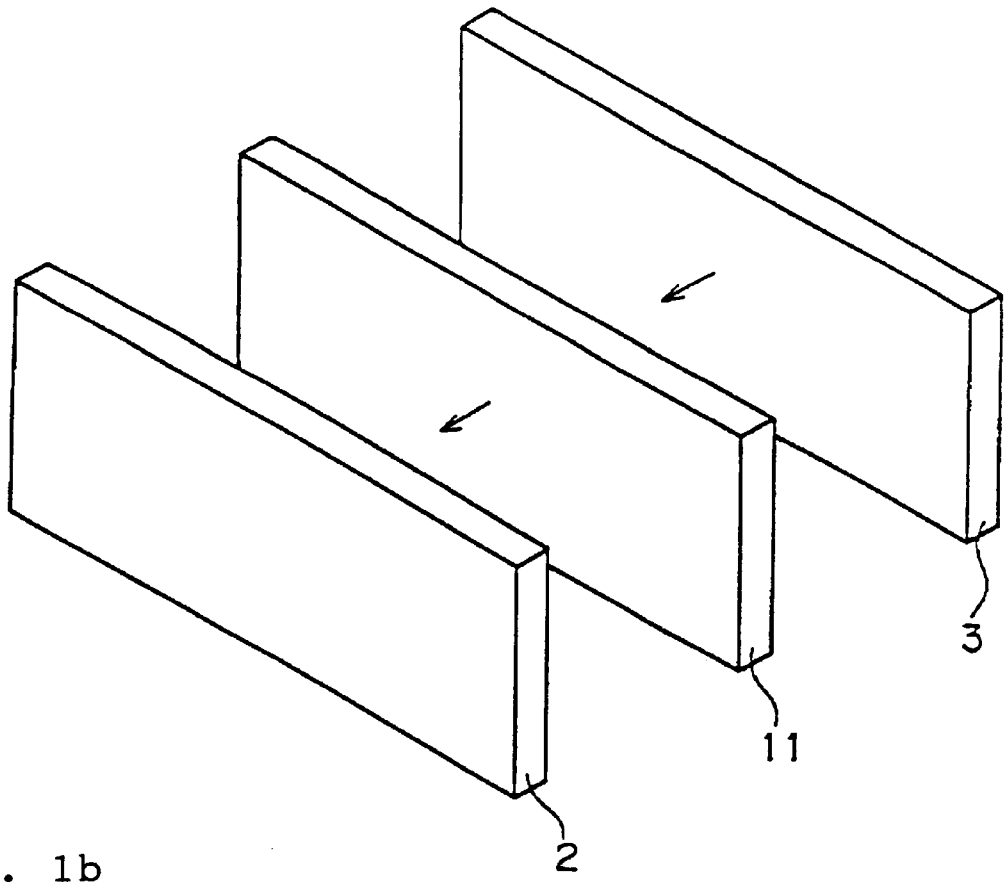
FIGS. 1a and 1b are diagrammatic perspective views illustrating one embodiment of a plasma display panel assembly according to the present invention.

The present invention will hereinafter be described in detail by way of various embodiments thereof.

According to the present invention, a heat radiation adhesive sheet comprising a specific heat radiation adhesive composition is used.

The specific heat radiation adhesive composition is obtained by use of an elastic styrene polymer (component A), an adhesive-imparting agent (component B), an oil (component C) and a thermal conductivity-imparting agent (component D).

The elastic styrene polymer (A) has a polystyrene block derived from styrene and an elastic intermediate block which provides elasticity therewith. Examples of the elastic styrene polymer include a tri-block copolymer of styrene-butadiene-styrene (SBS), a tri-block copolymer of styrene-isoprene-styrene (SIS), a hydrogenated SBS (SEBS) and a hydrogenated SIS (SEPS). These may be used either alone or in combination. Among these, SEBS is preferred in terms of heat resistance, and SEPS is preferred in terms of fluidity of a thermoplastic resin.

The elastic styrene polymer (A) preferably has a glass-transition temperature (Tg) of not greater than 100° C., more preferably 80 to 100° C. When the glass-transition temperature exceeds 100° C., it is likely to be difficult to soften and fuse the heat radiation adhesive sheet for separating the panel and the heat radiation plate. In the meantime, the glass-transition temperature (Tg) is measured by means of differential scanning calorimetry (DSC) or a tan σ speak of dynamic viscoelasticity.

The adhesive-imparting agent (B) used together with the component A is not particularly limited, as long as it is known in the field. Examples thereof include rosin resins (gum rosin, tall oil rosin, wood rosin, hydrogenated rosins, disproportionated rosins, polymerized rosins, maleic rosins, rosin glycerin esters, hydrogenated rosin glycerin esters and the like), terpene phenol resins, terpene resins (mainly comprising α-pinene, β-pinene, dipentene or the like), aromatic hydrocarbon modified-terpene resins, petroleum resins (aliphatic, alicyclic, aromatic and the like), coumarone-indene resin, styrene resins (styrenes, substituted-styrenes and the like), phenol resins (alkylphenol resins, rosin-modified resins and the like) and xylene resins. These may be used either alone or in combination.

The oil (C) used together with the components A and B is not particularly limited, but a paraffin oil is preferably used due to compatibility with the elastic styrene polymer (A). Especially, a paraffin oil without an aromatic ring (CA=0%) is preferred because bleeding does not occur and adhesion does not become weak.

Exemplary thermal conductivity-imparting agents (D) used together with the components A to C include aluminum nitride, silicon carbide, silicon nitride, boron nitride, metallic oxides (alumina) and metal powders. These may be used either alone or in combination. Among these, alumina is preferred as it provides good thermal conductivity, general-purpose properties and cost-efficiency.

In the heat radiation adhesive composition, the components B, C and D are preferably present in amounts of 50–400, 20–300 and 200–1,000 parts by weight (hereinafter abbreviated as "part"), respectively, based on 100 parts of the component A. When the composition has the above mentioned content ratio, it exhibits good adhesion and heat radiation at operational temperatures, and further the composition is softened and fused at a temperature of slightly higher than 100° C. so that the panel can easily be separated from the heat radiation plate. When the B content is less than 50 parts, the heat radiation adhesive sheet may have an insufficient adhesion. On the contrary, a content of greater than 400 parts of Component B may deteriorate formulation balance with other components, thereby making it difficult to obtain the intended effect. When the C content is less than 20 parts, spreadability (fluidity) tends to become worse. Greater than 300 parts of Component C may cause softening, fusion or exudation in the heat radiation adhesive sheet even at operational temperatures. Where the D content is less than 200 parts, thermal conductivity tends to become insufficient. When the D content is greater than 1,000, the formulation balance with other components may be deteriorated, thereby making it difficult to obtain the intended effect. In addition, the components B, C and D are more preferably present in amounts of 100–350, 50–200 and 300–900 parts, respectively, based on 100 parts of the component A.

An anti-aging agent and the like may optionally be added to the heat radiation adhesive composition containing the components A to D.

As the anti-aging agent, for example, aldehydes, amines and phenols may be used either alone or in combination.

Among these, hindered phenol, 1,1-bis-(4-hydroxyphenyl)-cyclohexane, dilauryl thiodipropionate, tetrakis-[methylene-3-(3',5'-di-tertiary butyl-4'-hydroxyphenyl)propionate] methane, a mixture of tris(mono-nonylphenyl)phosphite and tris(di-nonylphenyl)phosphite and zinc di-n-butyldithiocarbamate are preferably used either alone or in combination.

The anti-aging agent is present in an amount of 0.2 to 10 parts based on 100 parts of the elastic styrene polymer (A) from the viewpoint of age resistance improvement of the heat radiation adhesive sheet.

The heat radiation adhesive sheet used for the present invention can be prepared in the following manner. The components A to D are blended in an appropriate ratio, and then mixed by an appropriate means thereby to produce a heat radiation adhesive composition. The heat radiation adhesive composition is formed into a sheet by an appropriate means, thereby obtaining a heat radiation adhesive sheet.

Figure 1B:
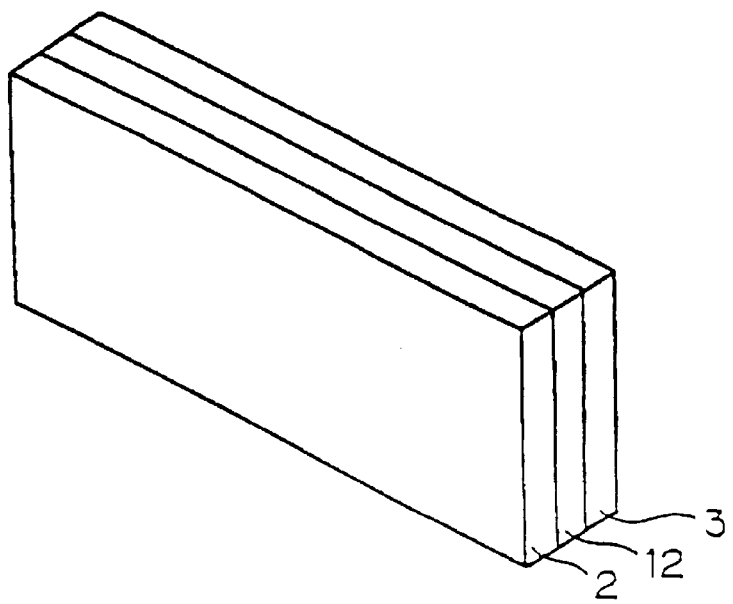

According to the present invention, a plasma display panel assembly is prepared by use of the thus obtained heat radiation adhesive sheet. The plasma display panel assembly, as shown in FIG. 1a, is obtained by attaching the heat radiation adhesive sheet 11 and a heat radiation plate 3 (aluminum chassis and the like) in turn onto a rear face of a panel 2 (glass panel and the like). In FIG. 1b, the reference number 12 indicates a heat radiation adhesive sheet layer which includes the heat radiation adhesive sheet 11.

The plasma display panel assembly is produced by use of the heat radiation adhesive sheet 11 comprising the specific heat radiation adhesive composition. Therefore, the panel 2 is attached to the heat radiation plate 3 in a good condition and, during operation, the heat generated on a surface of the panel 2 can smoothly be removed. When it becomes necessary to separate the panel 2 from the heat radiation plate 3 for collection at the end of service life and the like, heating the plasma display panel assembly at temperatures slightly higher than 100° C. (about 101–120° C.) leads to softening and fusing of the heat radiation adhesive sheet layer 12 for easy separation and collection.

In addition, the plasma display panel assembly of the present invention can be separated into the panel 2 and the heat radiation plate 3 by dissolving the heat radiation adhesive sheet layer 12 by use of an organic solvent such as toluene instead of the above mentioned heating method.

The present invention will hereinafter be explained by way of Examples and Comparative Examples thereof.

EXAMPLES 1, 2 AND COMPARATIVE EXAMPLE

Heat radiation adhesive sheets were produced by use of heat radiation adhesive compositions prepared in accordance with the following formulations (a) for Example 1, (b) for Example 2 and (c) for the Comparative Example.

Formulation (a)

SEBS 100 parts
(TUFTEC 1051 manufactured by Asahi Chemical Industry Co., Ltd., Tg:93° C.)

Hydrogenated terpene adhesive-imparting agent 300 parts
(CLEARON P105 manufactured by Yasuhara Chemical Co., Ltd.)

Paraffin oil 100 parts
(DIANA PROCESS OIL PW-90 manufactured by Idemitsu Kosan Co., Ltd., analysis of carbon type: CA=0%, CN=29.0%, CP=71.0%)

Thermal conductivity-imparting agent 800 parts
(ALUMINA AS-30 manufactured by Showa Denko K.K.)

bisphenol antioxidant 1 part (NOCRAC NS-6 manufactured by Ouchi Shinko Chemical Industries Co., Ltd.)

Formulation (b)

SEPS 100 parts
(SEPTON 2003 manufactured by Kuraray Co., Ltd., Tg:93° C.)

alicyclic adhesive-imparting agent 150 parts
(ARKON -P-140 manufactured by Arakawa Chemical Industries, Ltd.)

paraffin oil 150 parts
(DIANA PROCESS OIL PW-90 manufactured by Idemitsu Kosan Co., Ltd., analysis of carbon type: CA=0%, CN=29.0%, CP=71.0%)

thermal conductivity-imparting agent 600 parts
(ALUMINA AS-30 manufactured by Showa Denko K.K.)

bisphenol antioxidant 1 part
(NOCRAC NS-6 manufactured by Ouchi Shinko Chemical Industries Co., Ltd.)

Formulation (c)

acrylic adhesive 100 parts
(AS-6300 manufactured by Ipposha Oil Industries Co., Ltd.)

crosslinking agent 1.5 parts
(B-45 manufactured by Ipposha Oil Industries Co., Ltd.)

thermal conductivity-imparting agent 160 parts
(ALUMINA AS-30 manufactured by Showa Denko K.K.)

EXAMPLES 3 AND 4

Examples 3 and 4 were prepared in accordance with the formulations identical to that of Example 1 with the exception that the content of the hydrogenated terpene adhesive-imparting agent was 50 parts for Example 3 and 400 parts for Example 4.

EXAMPLES 5 AND 6

Examples 5 and 6 were prepared in accordance with the formulations identical to that of Example 1 with the exception that the content of the paraffin oil was 20 parts for Example 5 and 300 parts for Example 6.

EXAMPLES 7 AND 8

Examples 7 and 8 were prepared in accordance with the formulations identical to that of Example 1 with the exception that the content of the thermal conductivity-imparting agent was 200 parts for Example 7 and 1,000 parts for Example 8.

The thus obtained sheets were each evaluated in accordance with the following methods with respect to thermal conductivity ratio, tackiness, maintenance of adhesive properties and solvent solubility. The results of the evaluations are shown in Table 1.

THERMAL CONDUCTIVITY RATIO

First, one face of a sample of the heat radiation adhesive sheet was heated, and the face temperature (Th) and the other face temperature (Tc) were measured. Then, as the other face temperature (Tc) was changed while holding the one face temperature (Th) constant, the temperature difference between Th and Tc was varied. While doing so, an amount of heat (P) at each difference (Th−Tc) was measured, which was generated so as to hold the one face temperature (Th) constant. In accordance with a plurality of co-ordinates (usually 3 co-ordinates) representing the amount of heat (P) and the difference (Th−Tc), a linear line having a relation represented by the formula P=(KS/L)(Th−Tc)+Qe was determined by the method of least squares. Consequently, a thermal conductivity ratio (K) was determined by a slope of the linear line. In the above formula, Qe represents an error value of the amount of heat, which was lost from the amount of heat, and S and L represent a cross-sectional area and a thickness of the sheet, respectively.

TACKINESS

Figure 2:
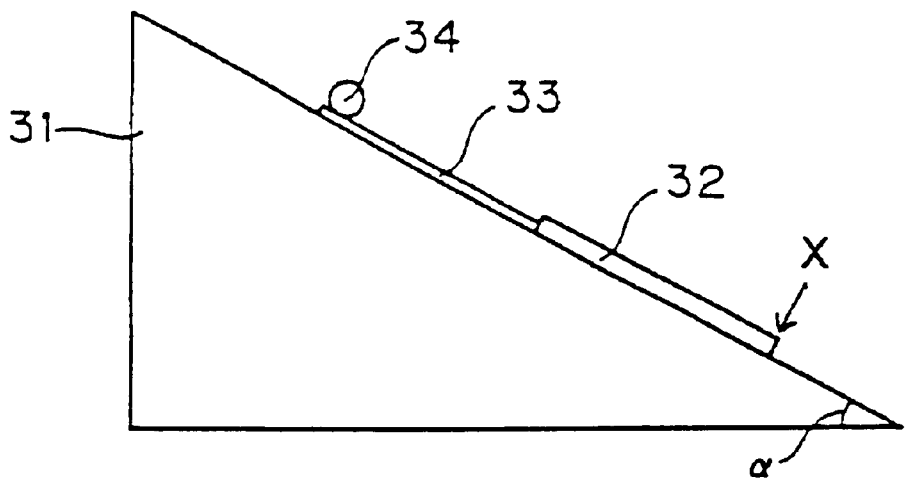
FIG. 2 is a diagrammatic view illustrating a method for measuring tackiness.

As shown in FIG. 2, the heat radiation adhesive sheets were each tested in the following manner. The heat radiation adhesive sheet 32 with dimensions of 100 mm(L)×50 mm(W)×1 mm(T) and a polyester film 33 with dimensions of 100 mm(L)×50 mm(W)×25 μm(T) for an approach run were attached on a slope 31 with a tilt angle α of 30 degrees. An iron ball 34(15 mm φ) was placed on an upper end of the polyester film 33. Then, the ball 34 was allowed to roll and, after rolling on the polyester film 33, if the ball stops between the lower end of the polyester film 33 and a point X on the heat radiation adhesive sheet 32, 100 mm downward away from the polyester film 33, for not less than 5 seconds, the heat radiation adhesive sheet was evaluated as possessing tackiness. It is to be appreciated that when samples are evaluated as possessing tackiness under the above measurement conditions, the samples are usable as an adhesive sheet to bond the panel to the heat radiation plate in the plasma display panel assembly according to the invention.

MAINTENANCE OF ADHESIVE PROPERTIES AT 110° C.

Figure 3:
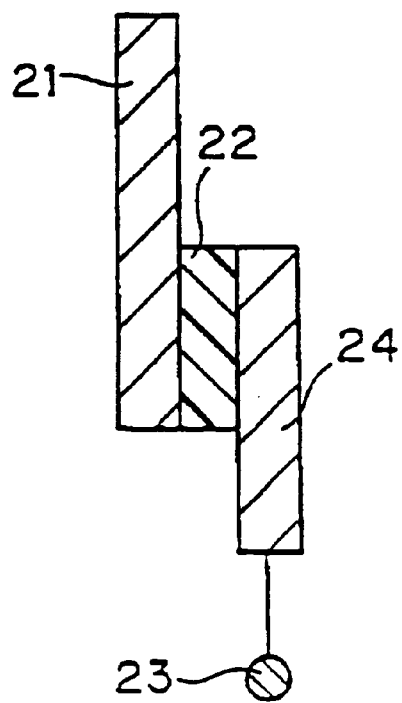
FIG. 3 is a diagrammatic sectional view illustrating a method for measuring the maintenance of adhesive properties at 110° C.
Figure 4:
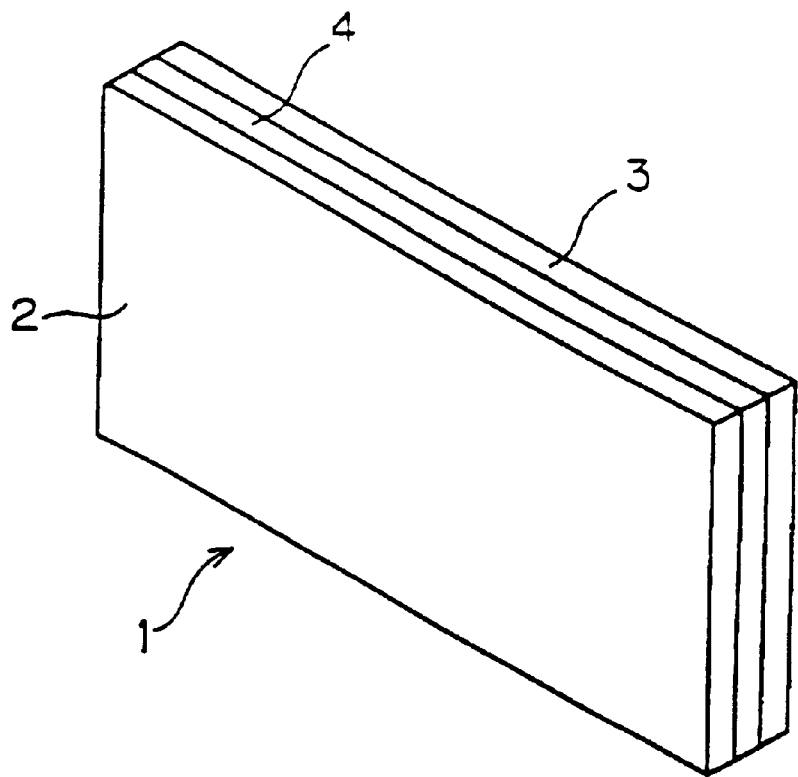
FIG. 4 is a diagrammatic perspective view illustrating a conventional plasma display panel assembly 1.
Figure 5:
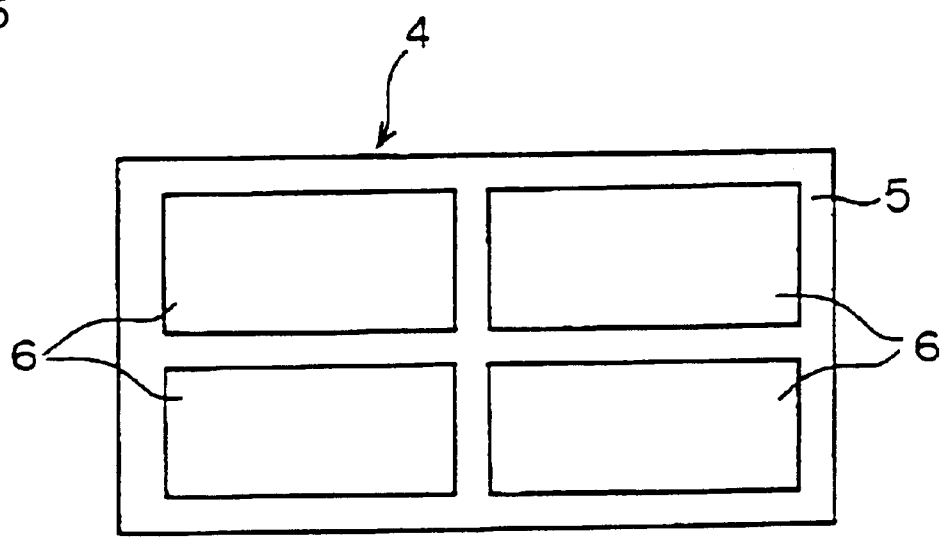
FIG. 5 is a diagrammatic view illustrating one example of a thermally conductive sheet layer 4 for use in the plasma display panel assembly 1 shown in FIG. 4.

As shown in FIG. 3, heat radiation adhesive sheet 22 (25 mm square, 1 mm thickness) was attached to an end of a glass plate 21, and then an aluminum plate 24 with a weight 23 (60 g) hung on the end thereof was attached to the other side of the sheet 22. Immediately after that, the resultant product was placed in a constant temperature bath set at 110° C. for measuring the time that elapsed before the glass plate 21 or the aluminum plate 24 became separated from the sheet.

SOLVENT SOLUBILITY

The heat radiation adhesive sheets (25 mm square, 2 mm thickness) were each immersed in toluene for one hour, and visually observed for evaluation.

TABLE 1

|  | EXAMPLES | | | | | | | | COMPARATIVE |
| --- | --- | --- | --- | --- | --- | --- | --- | --- | --- |
|  | 1 | 2 | 3 | 4 | 5 | 6 | 7 | 8 | EXAMPLE |
| thermal conductivity ratio (W/m ° C.) | 0.60 | 0.60 | 0.70 | 0.55 | 0.64 | 0.50 | 0.40 | 0.65 | 0.58 |

TABLE 1-continued

| | EXAMPLES | | | | | | | | COMPARATIVE |
|---|---|---|---|---|---|---|---|---|---|
| | 1 | 2 | 3 | 4 | 5 | 6 | 7 | 8 | EXAMPLE |
| tackiness maintenance of adhesive properties at 110° C. | possess less than 1 min. | possess less than 1 min. | possess less than 1 min. | possess less than 1 min. | possess less than 1 min. | possess less than 1 min. | possess less than 1 min. | possess less than 1 min. | possess exceeding 3 hrs. |
| solvent-solubility | soluble | soluble | soluble | soluble | soluble | soluble | soluble | soluble | swelling |

The heat radiation adhesive sheet obtained from the formulation (a) was interposed between the glass panel and the aluminum chassis, thereby obtaining a plasma display panel assembly. The thus obtained plasma display panel assembly was visually observed with respect to its attachment portions, which were confirmed to be in a good condition. When an image was practically displayed on a surface of the glass panel, it was further confirmed to release the heat in a good manner. When the plasma display panel assembly was heated to 110° C. for separation and collection, it was further confirmed that the glass panel and the aluminum chassis were easily separated.

EFFECT OF THE INVENTION

As described hereinbefore, the plasma display panel assembly of the present invention includes the panel, the heat radiation plate and the heat radiation adhesive sheet layer interposed between the panel and the plate. The heat radiation adhesive sheet to be used in the heat radiation adhesive sheet layer is formed of the specific heat radiation adhesive composition containing the elastic styrene polymer (A), the adhesive-imparting agent (B), the oil (C) and the thermal conductivity-imparting agent (D), so that the plasma display panel assembly maintains a good attachment condition during operation and smoothly dissipates heat. When separation and collection are necessary, heating the display panel assembly to temperatures slightly higher than 100 ° C. leads to softening and fusing of the heat radiation adhesive sheet layer for easily separating the heat radiation plate from the panel.

Particularly, it is advantageous that when the content of each component in the heat radiation adhesive composition is in a specific range, the plasma display panel assembly exhibits much better adhesion and heat radiation at temperatures of practical operation. Further, the heat radiation adhesive sheet has properties to be softened and fused at temperatures slightly higher than 100° C., so that the panel and the heat radiation plate are more easily separated.

It is also advantageous that the panel and the heat radiation plate can be separated at a relatively lower temperature when the elastic styrene polymer (A) having a glass transition temperature of a specific range is used in the heat radiation adhesive composition.

Moreover, when a specific material is used as the adhesive-imparting agent, the oil and the thermal conductivity-imparting agent, the composition is suitable as a material for the heat radiation adhesive sheet interposed between the panel and the heat radiation plate.

What is claimed is:

1. A plasma display panel assembly comprising a panel, a heat radiation plate and a heat radiation adhesive sheet layer interposed therebetween, wherein a heat radiation adhesive sheet for use in the heat radiation adhesive sheet layer is formed of a heat radiation adhesive composition containing the following components (A) to (D):

(A) elastic styrene polymer
   (B) adhesive-imparting agent
   (C) oil
   (D) thermal conductivity-imparting agent.

2. The plasma display panel assembly according to claim 1, wherein the components B, C and D are present in amounts of 50–400, 20–300 and 200–1,000 parts by weight, respectively, based on 100 parts by weight of the component A.

3. The plasma display panel assembly according to claim 1, wherein the elastic styrene polymer (A) has a glass transition temperature (Tg) of not greater than 100° C.

4. The plasma display panel assembly according to claim 2, wherein the elastic styrene polymer (A) has a glass transition temperature (Tg) of not greater than 100° C.

5. The plasma display panel assembly according to claim 1, wherein the adhesive-imparting agent (B) is selected from a terpene adhesive-imparting agent and an alicyclic adhesive-imparting agent, the oil (C) is a paraffin oil and the thermal conductivity-imparting agent (D) is alumina.

6. The plasma display panel assembly according to claim 2, wherein the adhesive-imparting agent (B) is selected from a terpene adhesive-imparting agent and an alicyclic adhesive-imparting agent, the oil (C) is a paraffin oil and the thermal conductivity-imparting agent (D) is alumina.

7. The plasma display panel assembly according to claim 3, wherein the adhesive-imparting agent (B) is selected from a terpene adhesive-imparting agent and an alicyclic adhesive-imparting agent, the oil (C) is a paraffin oil and the thermal conductivity-imparting agent (D) is alumina.

8. The plasma display panel assembly according to claim 4, wherein the adhesive-imparting agent (B) is selected from a terpene adhesive-imparting agent and an alicyclic adhesive-imparting agent, the oil (C) is a paraffin oil and the thermal conductivity-imparting agent (D) is alumina.

\* \* \* \* \*